United States Patent
Uchida et al.

[11] 4,178,073
[45] Dec. 11, 1979

[54] OPTICAL ISOLATOR

[75] Inventors: Teiji Uchida; Atsufumi Ueki, both of Tokyo, Japan

[73] Assignee: Nippon Electric Co., Ltd., Tokyo, Japan

[21] Appl. No.: 911,116

[22] Filed: May 31, 1978

[30] Foreign Application Priority Data

May 31, 1977 [JP] Japan .................. 52/64315

[51] Int. Cl.² ........................... G02F 1/09
[52] U.S. Cl. ............................. 350/151
[58] Field of Search .......... 350/147, 151, 157

[56] References Cited
U.S. PATENT DOCUMENTS

| | | | |
|---|---|---|---|
| 3,495,892 | 2/1970 | Dailey | 350/151 |
| 3,512,867 | 5/1970 | Pearson et al. | 350/151 |
| 3,523,718 | 8/1970 | Crow | 350/151 |
| 3,617,129 | 11/1971 | Skolnick | 350/151 |

*Primary Examiner*—John K. Corbin
*Assistant Examiner*—R. A. Rosenberger
*Attorney, Agent, or Firm*—Hopgood, Calimafde, Kalil, Blaustein & Lieberman

[57] ABSTRACT

An optical isolator maintains the intensity of light traveling therethrough in a forward direction, irrespective of the condition of polarization of the light, while substantially, preventing light having any condition of polarization from traveling therethrough in a reverse direction. The optical isolator generally includes first polarization apparatus to divide an incident light beam into two linearly polarized light beams having their directions of polarization perpendicular to each other, a non-reversible polarizing rotation element to rotate each of said linearly polarized light beams to form two rotated linearly polarized light beams and polarization converting apparatus which, in conjunction with a second polarization apparatus, synthesizes the two rotated linearly polarized light beams.

11 Claims, 4 Drawing Figures

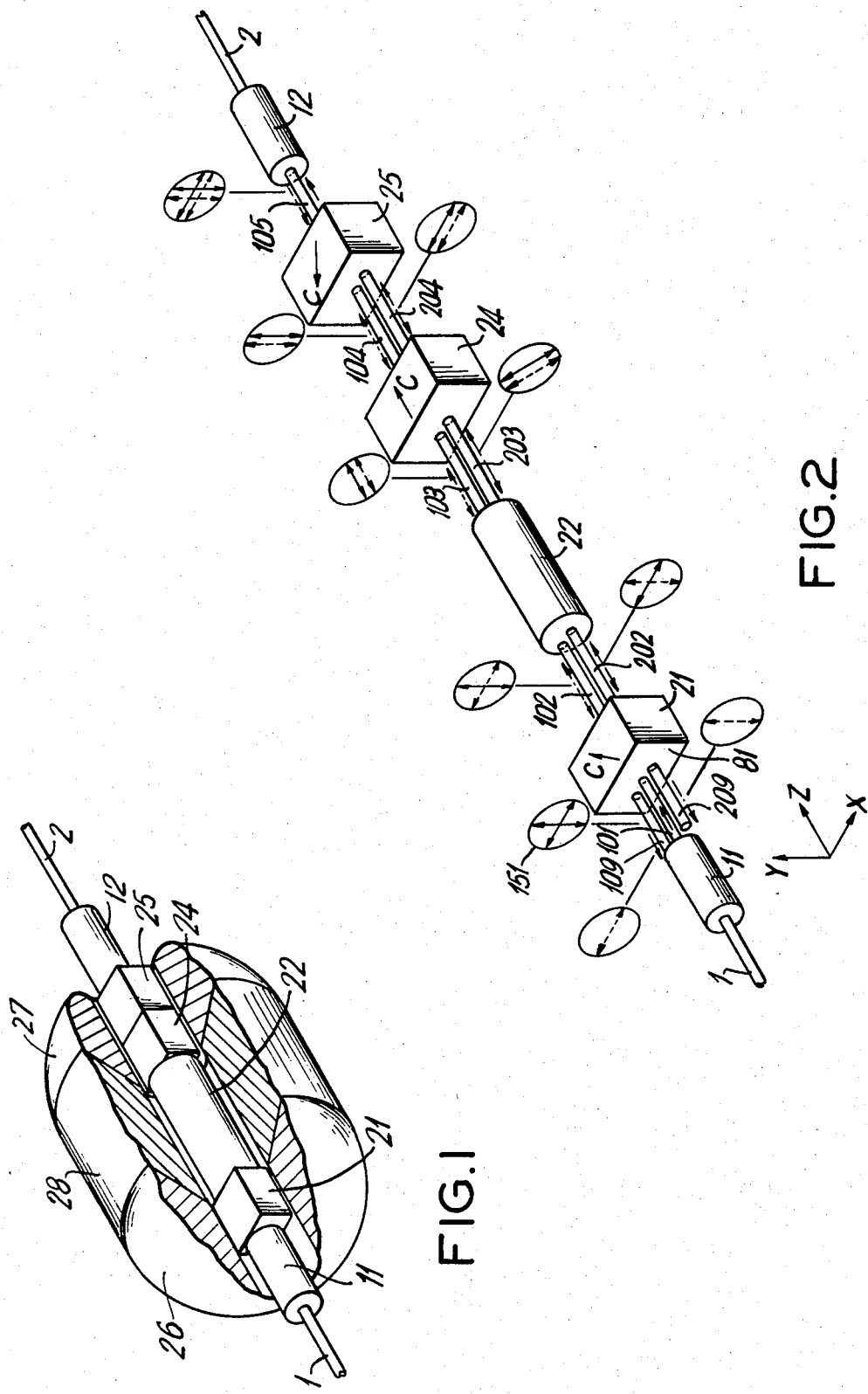

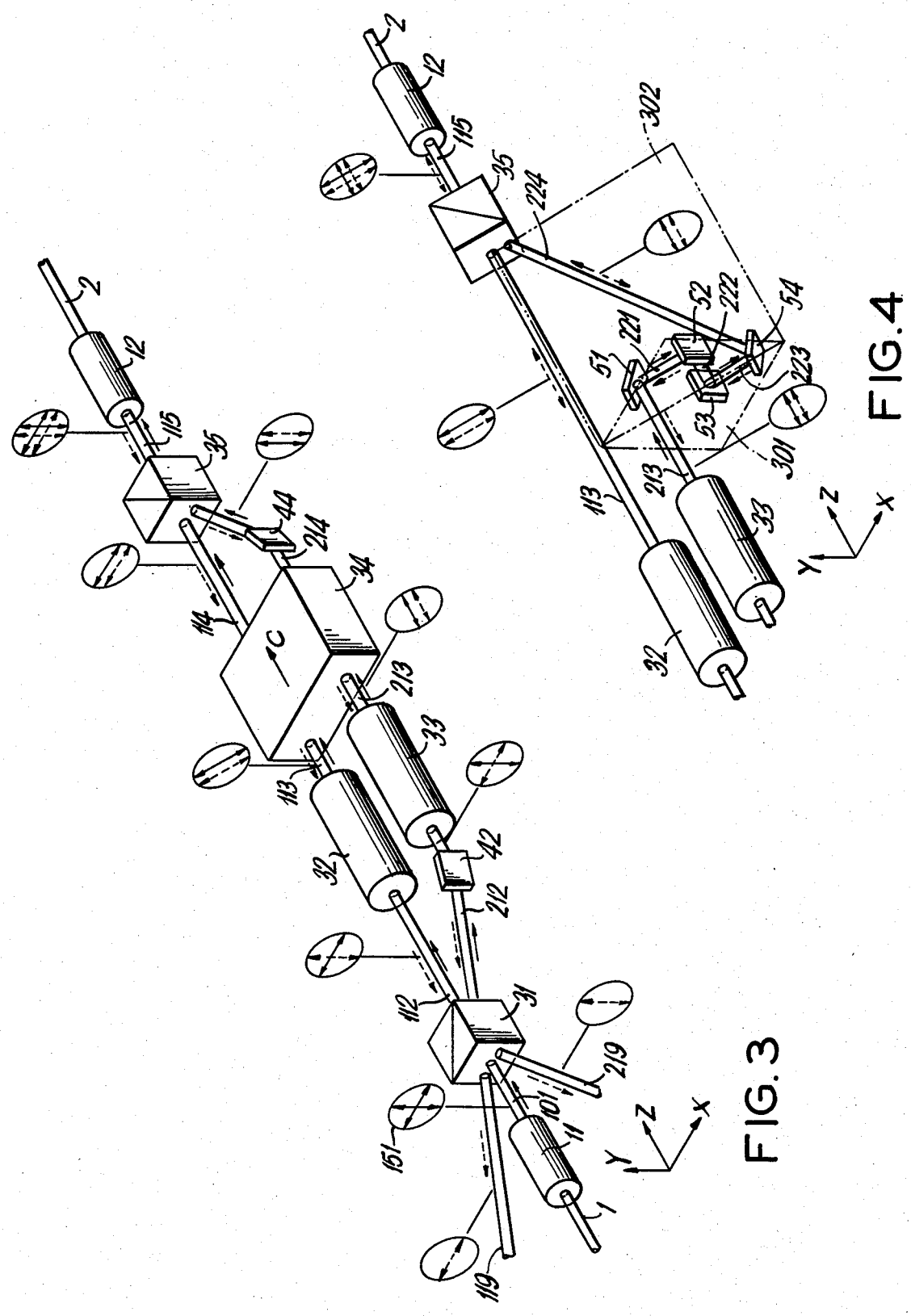

OPTICAL ISOLATOR

FIELD OF THE INVENTION

This invention relates to isolators useful in the optical wavelength range, and more particularly to optical isolators suitable for optical fiber communications and similar purposes.

DESCRIPTION OF THE PRIOR ART

Since research and development in the field of optical fiber communications is making rapid progress, new problems in the performance of various optical devices used for optical fiber communications, (such as optical fibers and devices connecting a light source with optical fibers), especially decrease in insertion loss, have arisen. One such problem arises when, using a laser oscillator as a light source, the light reflected on an end face or other part of an optical device returns to the light source without much loss. Such a reflection adversely affects the performance characteristics of the light source and therefore deteriorates the quality of communication, sometimes extremely. Another problem is that of echoes accompanying transmitted signals which is caused by multiple reflections on the end face or other part of an optical device.

The deterioration of the performance characteristics of the light source due to the return of reflected light has been previously observed in connection with the stability of self-mode locking. The prevention of such deterioration has been attempted by the use of a reflected light eliminating device which combines a polarizer and a quarter-wave length plate. See for example "Interferometric Measurement of SELFOC" by E. G. Rawson et al., pp. 1114–1115, IEEE Journal of Quantum Electronics, Vol. QE-9, No. 11, November 1973. Another attempt includes an optical isolator comprising a polarizer, a Faraday rotation element and an analyzer. See "Compact Optical Isolator" by F. J. Sansalone, pp. 2329–2331, Applied Optics, Vol. 10, No. 10, October 1971. However these devices are unable to fully solve the above-stated problem which has arisen in connection with optical fiber communication. These devices failed because although a linearly polarized component in one direction is theoretically subject to no loss, the linearly polarized element perpendicular to that component is wholly lost. Since an optical fiber is normally unable to propagate light without varying the state of polarization, the connection of any such device with the optical fiber would almost inevitably result in a loss of around 3 dB, which may vary depending up on the condition of polarization. The reflected light eliminating device combining a polarizer and a quarter-wave length plate has been unable to adequately eliminate the reflected light returning through the optical fiber in a not necessarily circularly polarized condition, since it can adequately eliminate reflected light only when the light having through passed this device in the forward direction returns without change in its circularly polarized condition. This device therefore cannot be regarded as an optical isolator in the strict sense of the term.

It is therefore an object of the present invention is to provide an optical isolator which theoretically diminishes none of the incident light in the forward direction, irrespective of its condition of polarization, and which consequently is susceptible to little loss.

SUMMARY OF THE INVENTION

In accordance with this invention, there is provided an optical isolator primarily composed of a first double refraction element which divides the forward-directed incident light beam into two linearly polarized light beams, a non-reversible polarizing rotation element which rotates the two linearly polarized light beams by $(2M\pm\frac{1}{2})$ right angles and $(2n\pm\frac{1}{2})$ right angles, respectively (where both m and n are integers), and a second double refraction element which synthesizes the two linearly polirized light beams by utilizing the perpendicularity of their polarization.

The first double refraction element divides the forward-directed incident light beam into two linearly polarized light beams, and the two resultant linearly polarized light beams, after passing through the non-reversible polarizing rotation element, are synthesized by the second double refraction element. The directions of polarization of the two linearly polarized light beams, divided by the first double refraction element, are perpendicular to each other and, since this perpendicularity is unaffected by their passage through the non-reversible polarizing rotation element, the second double refraction element utilizes this perpendicularity to synthesize the linearly polarized light beams theoretically without loss. When the light beam emanating from this optical isolator is reflected and returns in an unspecified condition of polarization or when any light beam enters this optical isolator from the reverse direction, the second double refraction element divides the reverse-directed light beam into two linearly polarized light beams. Since the double refraction element is reversible, the two divided linearly polarized beams would be polarized in the same directions and travel along the same paths (though in the reverse direction), respectively, as the forward-directed, linearly polarized light beams. The non-reversible polarizing rotation would rotate the directions of polarization of the two reverse-directed linearly polarized light beams by $-(2m\pm\frac{1}{2})$ right angles and $-(2n\pm\frac{1}{2})$ right angles, respectively, and their differences, from those of the forward-directed linearly polarized light beams travelling the same paths, would respectively be $(4m\neq\pm1)$ [i.e. $2\times(2m\neq\pm\frac{1}{2})$] right angles and $(4n\neq\pm1)$ right angles. (Since the directions of the polarizing rotation by the non-reversible polarizing rotation element of the forward- and reverse-directed light beams, as viewed in the direction of travel of the light beams, are opposite to each other, the angle of the polarizing rotation as viewed in the forward direction of a light beam is doubled as it passes back through this element.) Therefore, the direction of polarization of a reverse-directed, linearly polarized light beam, having passed through the non-reversible polarizing rotation element, will become perpendicular to that of a forward-directed, linearly polarized light beam travelling the same path. As the reverse-directed, linearly polarized light beam traveling in the same path as the forward-directed, linearly polarized light beam enters the first double refraction element, it cannot reversely travel the path of the forward-directed light beam but emanates via a different path. In other words, after passing back through the first double refraction element, the reverse-directed light beam does not travel the same path as the forward-directed light beam, thereby enabling the optical isolator to fulfill its function.

It is a feature of this invention that the optical isolator described herein is theoretically susceptible to no loss, more particularly, the forward-directed incident light beam suffers no loss when it is divided by the first double refraction element into two linearly polarized light beams perpendicular to each other, and if the condition of polarization of the incident light beam changes, only the ratio between the intensities of the two linearly polarized light beams will change, but the sum of their intensities will remain equal to the intensity of the incident light beam. Since, theoretically, no loss can occur to the two linearly polarized light beams when they next pass through the non-reversible polarizing rotation element, the same can be said of the sum of the intensities of these two linearly polarized light beams entering the second double refraction element.

Theoretically no loss can also occur during the synthesis of these two linearly polarized light beams by the second double refraction element, because the synthesis utilizes the perpendicularity of the polarized beams, and the intensity of the synthesized, emanating beam will equal to that of the incident light beam. Thus, in the optical isolator of the present invention, the forward-directed incident light beam is theoretically subject to no loss, and any polarization-dependent loss of this incident light beam can not occur. Although in reality the components constituting this optical isolator may somewhat diminish the intensity of the incident light beam, it is possible to choose low-loss elements to achieve an optical isolator which permits little loss, irrespective of on the condition of polarization of the incident light beam.

These and other objects, features and advantages of the present invention will be apparent from the following description taken in conjunction with the accompanying drawings.

FIG. 1 is a perspective view of a first embodiment of this invention, with part of it cut away.

FIG. 2 is a perspective view of the principal parts of the embodiment illustrated in FIG. 1, disconnected from one another to show how the light is propagated and polarized.

FIG. 3 is a perspective view of a second embodiment of this invention, also disconnected.

FIG. 4 is a perspective view of a third embodiment of this invention, again disconnected.

DETAILED DESCRIPTION OF THE PREFERRED EMBODIMENTS

FIG. 1 is a perspective view of the most preferred embodiment (hereinafter called the first embodiment) of this invention, with part of it cut away. One of the end faces of a first optical fiber 1 is fixed to one of the end faces of a first light focusing transmission body 11 with a transparent adhesive having a refractive index of about 1.5, and the other end face of the first light focusing transmission body 11 is similarly fixed to a first birefringent crystal 21. Behind this first birefringent crystal 21 are successively fixed a Faraday rotation element 22, an optically active crystal 24, a second birefringent crystal 25 and a second light focusing transmission body 12, behind which, finally, a second optical fiber 2 is fixed. First and second semispherical permanent magnets 26 and 27, preferrably made of barium ferrite and bored along their central axes, are intended to apply a magnetic field to the Faraday rotation element 22 in its axial direction. As the flat and curved sides of the first permanent magnet 26 are the north and south poles, respectively, and conversely the flat and curved sides of the second permanent magnet 27 are the south and north poles, respectively, a magnetic field is created in the Faraday rotation element in the direction from the first permanent magnet 26 to the second permanent magnet 27 to rotate the plane of polarization of the light passing through the Faraday rotation element 22. A cylindrical spacer 28, also bored along its central axis prevents the first and second permanent magnets 26 and 27 from coming into contact with each other by their mutual attraction because of the opposite polarities of their flat sides, and three components are glued together in a permanent position. The elements fixed before and behind the Faraday rotation element 22, as illustrated, lie in the bore along the center axis of the three above-mentioned components and are fixed to the components with adhesive.

With reference to FIG. 2, the light radially emanating from the end face of the first optical fiber 1 is converted by the first light focusing transmission body 11 having a quarter pitch into a parallel light beam 101, which enters the first birefringent crystal 21. (The lens and other actions of the light focusing transmission body, which are described in detail in Japanese Pat. Nos. 47-816 and 47-6547, are not explained here).

The direction in which the light beam 101 travels is called the forward direction, represented in the figure by solid arrows, and the dotted arrows represent a reverse direction (the same applies hereinafter). Since the condition of polarization of the light beam having passed through an optical fiber cannot be specified, the light beam 101 can be polarized in any manner, which is represented in the figure by any of the polarizing condition diagrams 151 (the same applies hereinafter). Thus, if the x, y and z axes are set as illustrated, the condition of polarization of the light beam 101 can be generally expressed as a synthesis of the polarized component in the x direction and that in the y direction. These two directions of polarization (represented in the directions of electric field) are given in the polarizing condition diagrams 151 without regard for the ratio of intensities or phase relationship between the two polarized components. In any polarizing condition diagram that may appear hereinafter, solid arrows will represent the polarizing direction of a forward-directed light beam and dotted arrows, that of a reverse-directed light beam.

Preferably, the first birefringent crystal 21 is a piece of calcite. Two parallel planes, each at an angle of 48° to the crystal's optical axis (c axis), which is arranged, as illustrated, to lie in the xz plane, are the plane of incidence 81 and plane of emanation. While the y direction-polarized component of the light beam 101, being vertically incident on the plane of incidence 81, passes unaffected through the first birefringent crystal 21 as an ordinary ray and turns into a coaxial light beam 102, the x direction-polarized component of the light beam 101 is refracted on the plane of incidence 81 as an extraordinary ray, the extraordinary ray, thereby separated from the ordinary ray (the y direction-polarized component), is again refracted on the plane of emanation and becomes a light beam 202 which is parallel to but not coaxial with the aforementioned coaxial light beam 102. The actions of such birefringent crystals are described in detail in "A Proposal for Optical Dividers" (in Japanese) by Matsushita in the 1976 National Conference Record on Optical and Radio Wave Electronics, the Institute of Electronics and Communication Engineers of Japan (283). Both of these light beams 102 and 202 next enter the Faraday rotation element 22, preferably made of praseodymium glass. This Faraday rotation element 22, on which is impressed a magnetic field by the first and second permanent magnets 26 and 27 as stated above, turns by 45° counter-clockwise, as viewed towards the light source, the direction of polarization of the light passing in the forward (xz) direction. Thus, the light beams 102 and 202, as they pass this Faraday rotation element 22, are turned into two light beams 103 and 203, respectively which, as illustrated, are polarized in the directions inclined by ±45° with respect to the x direction. These light beams 103 and 203 next enter the optically active crystal 24. Since this optically active crystal 24, preferably made of dextral quartz, turns by 45° clockwise, as viewed towards the light source, the direction of polarization of the light passing in the direction of the optical axis (c axis), the light beams 103 and 203 which have entered in the direction of the optical axis emanate as two light beams 104 and 204, respectively which are polarized in the same directions as the incident light beams 102 and 202, respectively, coming into the Faraday rotation element 22. These light beams 104 and 204 next enter the second birefringent crystal 25, which synthesizes them into the single, parallel light beam 105 in exactly the converse action to that of the first birefringent crystal 21. The synthesized beam is then focused by the second light focusing transmission body 12 having a quarter pitch, and fixed to the second optical fiber 2.

In the reverse direction, the light emanating from the second optical fiber 2 in the reverse direction is turned by the second light focusing transmission body 12 into the parallel light beam 105 (Since the forward- and reverse-directed light beams share the same paths except the final ones, those passing the same paths are given the same reference numbers for convenience; the same applies hereinafter,) which enters the second double refraction element 25. The reverse-directed light beam 105, which can have any condition of polarization, is divided into the light beam 104 polarized in the y direction and the light beam 204 polarized in the x direction. Both light beams 104 and 204 undergo 45° clockwise rotation, as viewed towards the light source, by the optically active crystal 24 and become the light beams 103 and 203, respectively, which then enter the Faraday rotation element 22. The directions of polarization of these reverse-directed light beams 103 and 203 are the same as those of the forward-directed light beams 103 and 203, respectively, because the second double refraction element 25 and the optically active crystal 24 are reversible. However the Faraday rotation element 22 is non-reversible, so that the direction of polarization of any light passing it in the reverse direction is turned 45° clockwise, as viewed towards the light source, with the result that the directions of polarization of the light beams 102 and 202 passing through the Faraday rotation element 22 in the reverse direction are 90° apart from those of the forward-directed light beams 102 and 202, respectively. As these reverse-directed light beams 102 and 202 enter the first birefringent crystal 21, they are unable to travel the paths along which the forward-directed light beam 101 was divided into the two light beams 102 and 202, and instead emanate as the light beams 109 and 209, both following different paths from that of the forward-directed light beam 101. More specifically, the reverse-directed light beam 102 polarized in the x direction, which becomes an extraordinary ray in the first birefringent crystal 21, is refracted and emanates to the left of the forward-directed light beam 101, and the reverse-directed light beam 202 polarized in the y direction, which becomes an ordinary ray in the first birefringent crystal 21, proceeds unaffected and emanates to the right of the forward-directed light beam 101. Since these light beams 109 and 209 are parallel to but differently positioned from the forward-directed light beam 101, they are intercepted by dousers, which are not represented in the figure, and do not enter the first light focusing transmission body 11, since they would not be effectively coupled to the first optical fiber 1.

It is evident from the description above, that the optical isolator of this invention is theoretically subject to no loss, and to little loss in reality, irrespective of the condition of polarization, because any change in the condition of polarization of the forward-directed incident light would merely result in a change in ratio of intensities between the light beams 102 and 202.

Furthermore, since the light beams 102 and 202 emanating from the first birefringent crystal 21 of this embodiment are parallel to each other and can be allowed to enter, as they are, into the second birefringent crystal 25 to be synthesized, this first embodiment has the advantages of a more simple structure and reduced bulk over the second and third embodiments in which the light path has to be turned by a reflective mirror or the like. The dispensation with a reflective mirror or the like, moreover, means that the distance between the two light beams 102 and 202 can be made small enough to let the two beams commonly use the Faraday rotation element 22 and the optically active crystal 24 without great difficulty, and this feature further contributes to the simplicity of structure, facility of adjustment, fixation of arrangement, reduction of size and, reduction in cost. The elements of this first embodiment (such as the first optical fiber 1, first light focusing transmission body 11, first birefringent crystal 21, Faraday rotation element 22, optically active crystal 24, etc.) are sufficiently close to one another to make the overall dimensions small and, being fixed in position with a transparent adhesive, they are mechanically stable. Furthermore, since the refractive index of this transparent adhesive is about 1.5, which is approximately the same as the refractive indices of the elements which it bonds the optical isolator structure to almost wholly eliminates the surface reflection of each element, resulting in a low-loss optical isolator.

Although, in this first embodiment, a refractive index matching liquid can be used instead of the transparent adhesive to reduce the surface reflection of each element, additional means would then have to be employed it to achieve mechanical stability.

FIG. 3 is a perspective view of a second embodiment of the present invention. The light beam 101 which, as in the first embodiment, emanates from the first optical fiber 1 and is converted into a parallel beam by the first light focusing transmission body 11 enters a first Rochon prism 31, and is divided into two polarized light beams 112 and 212 which are perpendicular to each other. Since these two light beams are not parallel to each other, one of them, the beam 212, is turned by a first reflective mirror 42 to become parallel to the other, and then they are each correspondingly a led into first and second Faraday rotation element member 32 and 33, respectively. The light beams 113 and 213 emanating from the Faraday rotation element members 32 and 33 are further led into an optically active crystal 34. Since the Faraday rotation element members 32 and 33 and the optically active crystal 34 are similar to and have the same functions as the Faraday rotation element 22 and the optically active crystal 24, respectively, of the first embodiment, the changes in the condition of polarization are the same as in the first embodiment. The light beams 114 and 214 emanating from the optically active crystal 34, after the direction of the beam 214 is changed by a second reflective mirror 44, are synthesized by a second Rochon prism 35 utilizing the perpendicularity of polarization. The synthesized light beam 115, as in the first embodiment, is focused by the second light focusing transmission body 12 and coupled to the second optical fiber 2.

In the reverse direction, the light emanating from the second optical fiber 2 travels back along the path of the forward-directed light beam, is divided by the second Rochon prism 35, and then passes through the optically active crystal 34. As the divided beams pass through the Faraday rotation element members 32 and 33 in the reverse direction, their directions of polarization become perpendicular to those of the forward-directed beams, with the result that the light beam 112, which emerges from the first Faraday rotation element member 32, is refracted by the first Rochon prism 31 to become the light beam 219 and the light beam 212, which emerges from the second Faraday rotation element member 33 and is thereafter reflected by the first reflective mirror 42, proceeds straight ahead to become the light beam 119. Consequently there is no light beam that travels back along the path of the forward-directed incident light beam entering the first Rochon prism. Since the reverse-directed light beams 119 and 219 emanating from the first Rochon prism in this second embodiment differ in direction from the forward-directed incident light beam 101, they have the advantage of interfering less with the first optical fiber 1 than the corresponding light beams of the first embodiment, where dousers are used. Although this second embodiment is virtually comparable to the first embodiment with regard to the loss of the forward-directed incident light, a slight loss may result, depending on the condition of polarization of the incident light because the reflection factors of the first and second reflective mirrors cannot be made 100 percent.

However, this slight loss in the reflected beam may be compensated for by intentionally subjecting the non-reflected light beam 112 to a slight loss.

In this second embodiment, as in the first, it is possible to bring the first light focusing transmission body 11 into tight contact with the first Rochon prism 31, the Faraday rotation element members 32 and 33 into tight contact with the optically active crystal 34, and the second Rochon prism 35 into tight contact light with the second focusing transmission body 12 to reduce the overall size of the isolator or to eliminate surface reflections and stabilize the positional relationships by gluing together these adjoining elements.

Although one optically active crystal 24 (or 34) is used against two light beams 103 and 203 (or 113 and 213) perpendicular to each other in the direction of polarization both in the first embodiment and in the second embodiment, each light beam could also pass through a corresponding optically active crystal. By doing so, especially in the second embodiment where the two light beams 113 and 213 are relatively wide apart from each other, the optically active crystals could be reduced in size and accordingly made more economical. It is also permissible to change the direction of the magnetic field to reverse the direction of the Faraday rotation element members and use sinistral quartz as the optically active crystals 24 and 34 to compensate for the change. Other crystals or optically active organic liquids can of course be used as well.

The optically active crystal 24 (or 34) restores the original directions of polarization of the forward-directed light beams 103 and 203 (or 113 and 213) rotated by the Faraday rotation element 22 (or element members 32 and 33), and thereby makes it possible to accomplish the subsequent synthesis of the two light beams 104 and 204 (or 114 and 214) in a symmetric manner to the first birefringent crystal 21 (or Rochon prism 31). This feature greatly contributes to simplifying the optical isolator structure and to reducing the polarization dependence of the loss suffered by the forward-directed incident light.

FIG. 4 is a perspective view of a third embodiment of the present invention, in which some of the elements common to the second embodiment illustrated in FIG. 3 are not shown. Because the directions of polarization of the forward-directed light beams 113 and 213 emanating, as in the embodiment of FIG. 3, from the first and second Faraday rotation element members 32 and 33, respectively, are inclined by ±45° with respect to the x direction, the second Rochon prism 35, which the non-reflected light beam 113 directly enters, is inclined, in contrast to that in the second embodiment, by −45° with respect to the axis of the light beam 113 to avoid loss. Consequently, the light beam 224, which also enters this second Rochon prism 35, must lie in the plane 302 which contains the center axis of the non-reflected light beam 113 and is oriented at an angle of −45° to the x direction. Also, the direction of polarization of the light beam 224 must be perpendicular to this plane. The second, third, fourth and fifth reflective mirrors 51, 52, 53 and 54 act in combination to form the light beam 224 which satisfies these two requirements from the light beam 213 emanating from the second Faraday rotation element 33. The second reflective mirror 51 turns the light beam 213 into the light beam 221 which is at an angle of −45° to the x direction on the plane 301 which is parallel to the xy plane. The third reflective mirror 52 thereafter turns the direction of the light beam 221 by 90° on the plane 301 to form the light beam 222, and then the fourth reflective mirror 53 turns the direction of the light beam 222 by another 90° on the plane 301 to form the light beam 223. Since the light beam 223 is also on the aforementioned plane 302, which is at an angle of −45° to the x direction, the fifth reflective mirror 54 reflects the light beam 223 to form the light beam 224 which enters the second Rochon prism 35. While two reflective mirrors would be sufficient in this third embodiment if the direction of polarization of this last light beam 224 could be disregarded, four reflective mirrors are needed to make its direction of polarization perpendicular to the plane 302, which is at an angle of −45° to the x direction. In this third embodiment, the second reflective mirror 51 crosses the direction of polarization of the reflected light beam to lie in the plane 301, which is parallel to the xy plane, and the third and fourth reflective mirrors 52 and 53 serve to hold state. Consequently, the direction of polarization of the light beam 223, reflected by the fourth reflective mirror 53, automatically lies perpendicular to the plane 302, which is at an angle of −45° to the x direction. The fifth reflective mirror 54 further holds that state to give the light beam 224 required for ideal synthesis.

In an embodiment similar to the third embodiment, where four reflective mirrors 51, 52, 53 and 54 are used, the number of reflective mirrors can be reduced, but it is not to be overlooked that, with a smaller number of reflective mirrors, the condition of polarization of the light beam 224 diagonally entering the second Rochon prism 35 would deviate from optimum thereby resulting in synthetic loss. Moreover, the isolation from the reverse-directed light would be adversely affected. Since the direction of polarization of the reverse-directed light beam 224 diagonally emanating from the second Rochon prism is necessarily ideal (perpendicular to the plane 302 which is at an angle of $-45°$ to the x direction), its condition of polarization when the beam, reflected in succession by those reflective mirrors, enters the second Faraday rotation element 33 from the reverse direction is different from that of the forward-directed light beam 213. Consequently there emerges a component which goes back the same path as that of the forward-directed light to the first optical fiber 1. However, for purposes which permit inferior isolation, the reduction in number of reflective mirrors would be effective.

It would be obvious that the substitution of the reflective mirrors 51, 52, 53 and 54 in this third embodiment for the optically active crystal 34 of the second embodiment could also be applied to the first embodiment. In this instance, there would be an advantage over the third embodiment since only two reflective mirrors are needed because the two incident light beams entering into the second birefringent crystal 25 inclined by $-45°$ can be parallel to each other (although it is desirable for preservation of the condition of polarization to make the distance between the light beams entering the second birefringent crystal 25 equal to ½ of the distance between the light beams emanating from the first birefringent crystal 21).

It would also be obvious that the second Rochon prism 35 of the third embodiment could be replaced by something similar to the birefringent crystal 25 of the first embodiment to reduce the number of reflective mirrors.

In the second and third embodiments, the Rochon prisms 31 and 35 can be replaced by some other birefringent prisms, such as Nicol prisms or Wallaston prisms. Total reflection prisms can as well be used in place of the reflective mirrors 42, 44, 51, 52, 53 and 54.

In the embodiments described above, the pitch of the light focusing transmission bodies 11 and 12 need not be limited to ¼, but can also be ¾, 4/5, etc., to achieve essentially the same function. They can also be replaced by ordinary spherical lenses. It would further be obvious that the optical fibers 1 or 2 are necessary.

Furthermore, the birefringent crystals 21 and 25 and Rochon prisms 31 and 35 need not be made of calcite, but can also be fashioned of quartz or some other crystal having a birefringent property. The material for the Faraday rotation elements 22, 32 and 33 may comprise glass containing rare-earth elements, lead and/or bismuth or, where infrared rays are involved, the material may comprise crystals of YIG or the like. Although the light beams travel straight through the Faraday rotation elements 22, 32 and 33 in the embodiments, they may also be caused in a zigzag pattern between the two reflective faces. This arrangement is particularly effective for optical isolators using near-infrared wave lengths, where Faraday rotation is difficult to obtain.

The permanent magnets 26 and 27 may be made of barium ferrite or some rare-earth element, and they can also be shaped like horseshoes or otherwise as a couple of semispheres. The required magnetic field may also be created with electromagnets.

It further is possible to use the reverse-directed emanating light beams 109 and 209 (or 119 and 219) without intercepting them with dousers. They might also be synthesized by utilizing the perpendicularity of polarization.

Although several embodiments of this invention have been shown and described, it will be understood that various modifications may be made without departing from the spirit of this invention.

What is claimed is:

1. An optical isolator comprising, a first means of polarization for dividing an incident light beam into two linearly polarized light beams having their directions of polarization perpendicular to each other, a non-reversible rotation element for rotating each of said linearly polarized light beams to form two rotated linearly polarized light beams, a polarization converting means and a second means of polarization which is responsive to said polarization connecting means for synthesizing said two rotated linearly polarized light beams.

2. An optical isolator as set forth in claim 1 wherein said non-reversible rotation element comprises a Faraday rotation element to which a magnetic field is applied.

3. An optical isolator as set forth in claim 2 wherein said Faraday rotation element rotates the direction of polarization of each of said linearly polarized light beams of $2q\pm\frac{1}{2}$ right angles, where q is an integer.

4. An optical isolator as set forth in claim 3 wherein said first means of polarization comprises a birefringent crystal element having its optical axes inclined with respect to the incident light beam.

5. An optical isolator as set forth in claim 3 wherein said polarization converting means comprises an optically active element and said second means of polarization comprises a birefrigent crystal element having its optical axis inclined with respect to each of said rotated linearly polarized light beams.

6. An optical isolator as set forth in claim 2 wherein said Faraday rotation element comprises two Faraday rotation element members, disposed in parallel, each member rotating one of said two linearly polarized light beams by approximately $2n\pm\frac{1}{2}$ right angles and $2m\pm\frac{1}{2}$ right angles, respectively, wherein n and m are integers.

7. An optical isolator as set forth in claim 6 wherein said first means of polarization comprises a birefringent prism.

8. An optical isolator as set forth in claim 7 further including reflective means for aligning the two linearly polarized light beams in parallel and for directing said linearly polarized light beams to said Faraday rotation element.

9. An optical isolator as set forth in claim 6 wherein said polarization converting means includes an optically active element and reflective means and said second means of polarization comprises a birefringent prism.

10. An optical isolator as set forth in claim 6 wherein said polarization converting means includes a plurality of reflective mirrors and said second means of polarization comprises a birefringent prism.

11. An optical isolator comprising, an optical system circumferentially surrounded by a magnetic field device, said magnetic field device including a spacer and two semispherically shaped permanent magnets arranged on either side of said spacer and having their flat faces in contact with said spacer, said optical system including a first birefringent crystal element for dividing an incident light beam into two parallel linearly polarized light beams having their directions of polarization perpendicular to each other; a Faraday rotation element for rotating the directions of polarization of each of said parallel linearly polarized light beams by ½ right angle to form two parallel rotated linearly polarized light beams, an optically active crystal element for rotating each of said two parallel rotated linearly polarized light beams by ½ right angle in a direction opposite to the rotation applied by said Faraday rotation element to form two parallel converted rotated linearly polarized light beams, and a second birefringent crystal element for synthesizing said two parallel converted rotated linearly polarized light beams, said magnets, spacer and the elements of said optical system being arranged in close proximity to each other.

* * * * *